Sept. 10, 1957
N. H. CHRISTOPHER
READING HEAD
Filed July 20, 1954
2,806,096
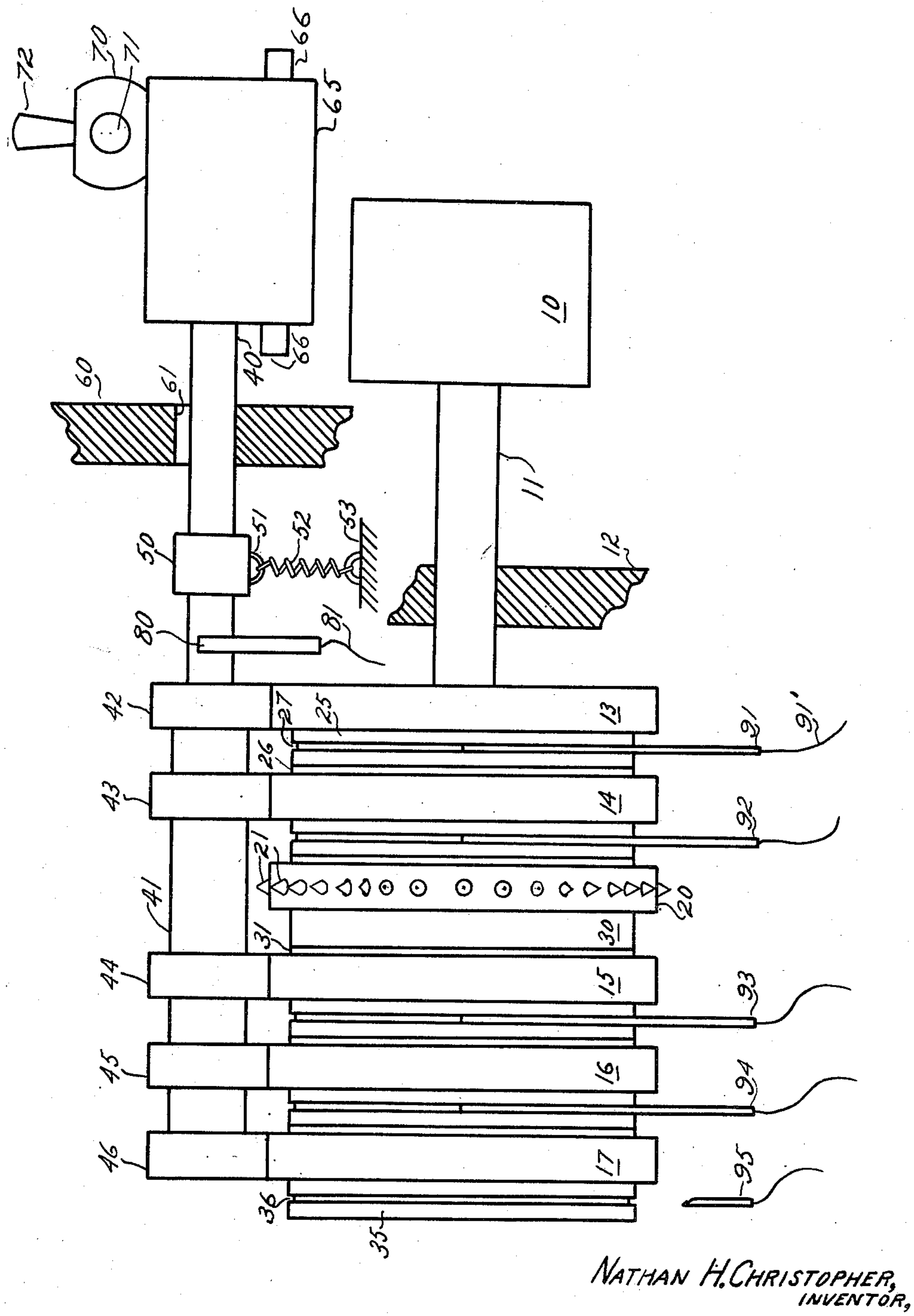
NATHAN H. CHRISTOPHER,
INVENTOR,
BY [signature]
HIS ATTORNEY

United States Patent Office 2,806,096

Patented Sept. 10, 1957

2,806,096

READING HEAD

Nathan Huff Christopher, Falls Church, Va.

Application July 20, 1954, Serial No. 444,675

2 Claims. (Cl. 200—46)

(Granted under Title 35, U. S. Code (1952), sec. 266)

The invention described herein may be manufactured and used by or for the Government for governmental purposes without the payment of any royalty thereon.

This invention is in the recording and reproducing art, and particularly is a reading head for deriving the intelligence impressed upon a perforated tape.

The principal object of the invention is to provide a high speed tape reader which operates without feeler pins, contacts (in the ordinary sense), and other expedients of tape readers found in the prior art.

A further object is to provide a high-speed tape reader for perforated tapes which is essentially silent in operation.

Another object of the invention is to provide a high-speed tape reader which reduces the likelihood of tape breakage.

An additional object is to provide means and a method for reading a perforated tape by running the same between rubber rollers.

A still further object is to provide a tape reader requiring no delicately adjustable springs, levers, and other such parts.

Yet further objections of the invention will be apparent from a reading of the following specification and claims.

The drawing is an illustration of the tape reader of my invention, somewhat diagrammatic, the parts being shown much exaggerated in size.

Referring now to the drawing, 10 represents a motor of standard type (not shown in detail), driven by power from a source (not shown) in conventional fashion. The motor is connected to and drives a shaft 11 which may be supported, as in structure 12, or not, as circumstances of the exact installation may require or permit.

Mounted on shaft 11 are five discs 13, 14, 15, 16, and 17 of conductive rubber, well known in the art, and these discs are so spaced from each other, by means hereinafter to be described, as to register with the five levels of perforations in a conventional five-level tape. It may be here mentioned that, notwithstanding the present description will be restricted to five level tapes, the invention hereof is readily adaptable to seven-level tapes and, indeed, to special tapes, it being necessary only that any information impressed upon such tapes occur in parallel lines or level, predictably spaced.

Approximately midway of the disc assembly, arranged to cooperate with the feed holes in a conventional five-level tape, is a sprocket wheel 20 provided with teeth as 21; this wheel, of course, actually feeds the tape to the reader. The sprocket wheel may be made of any convenient material, a metal, such as brass, being desirable.

Interposed between adjacent rubber discs, as 13 and 14, is a further disc 25 of conductive material, preferably metal, and a further disc 26 of insulating material, any of many plastics being suitable. Conductive disc 25, it will be observed, has a groove 27 extending thereabound.

Adjacent sprocket wheel 20 is a disc 30, similar to disc 25 except that it is formed without a central groove, and next to it is an insulating disc 31 similar to disc 26 already described. Disc 30, as will be more clearly pointed out below, serves no function except that of a spacer, and may, in fact, be formed of insulating material and may be integral with disc 31. The structure shown, however, presents certain advantages in the way of parts standardization, etc.

Next to conductive disc 17, to the left thereof (as shown in the drawing), is a conductive disc 35 with a circumferential groove 36, this member being identical with disc 25. In the present instance, however, no insulating member corresponding to parts 26 and 31, is necessary.

The various discs, together with the sprocket wheel, are mounted upon shaft 11 so as to be rotated therewith as a unitary structure. They should be fastened securely together, and for this purpose, insulated, countersunk, bolts and nuts may be assumed.

Mounted just above the elements already described is a further assembly including a shaft 40 and a sleeve 41 with five concentric ribs thereon 42, 43, 44, 45, and 46, these elements (excepting shaft 40) being formed of conductive rubber similar to that used in the discs 13–17 already described. The ribs as will be seen register with the several discs, and thus (in operation) will be aligned with the several levels of perforations in a punched tape.

To the right of the sleeve and rib assembly is a collar 50 surrounding shaft 40. Collar 50 is provided with a fixture 51 to which is connected a spring 52 which is secured at its other end in any convenient structure 53, it being understood that this arrangement tends to pull downwardly upon shaft 40, and thus to keep the several ribs 42–46 pressed upon the corresponding discs 13–17.

Beyond collar 50 is shown a portion of a wall 60 which helps to support the shaft, and it will be seen that opening 61 for the shaft is made somewhat larger in a vertical direction than the shaft itself. Beyond the wall-like structure 60 is a member 65 in which are arranged bearings (not shown) of conventional type for shaft 40. Member 65 is pivoted at 66, the pivot being mounted in any available support.

Cooperating with the upper surface of member 65 is a camming device 70, mounted for rotation upon a pivot 71, and provided with a handle 72 by means of which the camming device may be turned in either direction from the position shown.

An electrical contact 80, connected by a lead 81 to a source of power (not shown), is arranged to slide upon shaft 40, and thus provide an input for the tape reader; and arranged to slide in the grooves (as 27 and 36) of the several metal discs (25 and 35, respectively) are found electrical contacts 91, 92, 93, 94, and 95, each with a lead attached, as 91′, these leads going to end apparatus forming no part of the present invention.

The operation of my invention will be apparent from a rather brief description thereof. Assuming the parts to be in the positions shown, an operator should move handle 72 in either direction, thus bringing an effective part of cam 70 into working relation with member 65, and thereby turning the whole upper roller assembly upon its pivot 66, whereby the ribs 42–46 are separated from their cooperating discs 13 thru 17, this action of course being taken against, and therefor increasing, the tension of spring 52. The vertical elongation of opening 61 in structure 60 permits this required movement of the upper roller assembly.

With the principal elements of the tape reader separated from each other, a tape is inserted therebetween and the feed holes thereof are engaged with one or more of the teeth 21 of sprocket wheel 20, this automatically assuring registration of the several perforation levels with the approprite ribs and discs.

Camming device 70—72 is then returned to its normal position (as shown), and spring 52 retracts the upper roller assembly.

Assuming further that lead 81 of input contact 80 is connected to a source of potential, that the several output leads, as 91′ are connected to some utilizing apparatus, and that motor 10 is running, the tape is driven between the several ribs and their cooperating discs; so long as the tape is unpunched, then parts are insulated from each other thereby, but when perforations appear, the power of spring 52 is sufficient to cause the resilient rubber of which the ribs and discs are made to protrude slightly therethrough. Each time this occurs a circuit is made from the input source (not shown), through lead 81, contact 80, shaft 40, sleeve 41, and the appropriate rib (42, for example), to a disc (as 13), its adjacent grooved disc 25, contact 91, lead 91′ and the using apparatus.

The foregoing description is in specific terms and many modifications will suggest themselves. To mention a few examples: different forms of electrical contacts may easily be substituted for those shown and described, the grooves for the output contacts may be dispensed with, the mounting of the parts may be replaced by many other equivalent arrangements, etc. For the true scope of the invention therefor, reference should be had to the appended claims.

I claim:

1. In a reader for perforated tapes, a shaft and means for driving the same, a plurality of electrically-conductive resilient discs mounted on said shaft for rotation therewith, means for spacing said discs in accordance with the spacings of the levels of perforations in a tape to be read said last-mentioned means including a contact member for each said disc, another shaft, a plurality of ribs thereon of electrically-conductive resilient material spaced in substantial conformation with the spacings of said discs, and means for holding the ribs in firm contact with their respective discs.

2. In a reader for perforated tapes, a shaft and means for driving the same, a plurality of electrically-conductive resilient discs mounted on said shaft for rotation therewith, means for spacing said discs in accordance with the spacings of the levels of perforations in a tape to be read said last-mentioned means including adjacent discs each electrically connected to a first-mentioned disc, in pairs, each said adjacent disc having an annular groove therein, a plurality of electrical contacts each positioned to make sliding contact with one of said grooves, another shaft, a plurality of ribs thereon of electrically-conductive resilient material spaced in substantial conformation with the spacings of said discs, and means for holding the ribs in firm contact with their respective discs.

References Cited in the file of this patent

UNITED STATES PATENTS 2,297,772 Johnson ---------------- Oct. 6, 1942